(12) United States Patent
Eaton

(10) Patent No.: US 7,881,759 B2
(45) Date of Patent: Feb. 1, 2011

(54) SHAPED LOUDSPEAKER OUTPUT IN A COMMUNICATIONS HANDSET

(75) Inventor: William Chris Eaton, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1453 days.

(21) Appl. No.: 11/299,105

(22) Filed: Dec. 9, 2005

(65) Prior Publication Data

US 2007/0135180 A1    Jun. 14, 2007

(51) Int. Cl.
*H04M 1/00* (2006.01)
(52) U.S. Cl. .................................................. 455/575.7
(58) Field of Classification Search ................. 381/345; 455/575.1
See application file for complete search history.

(56) References Cited

U.S. PATENT DOCUMENTS

| | | | |
|---|---|---|---|
| 5,054,052 A * | 10/1991 | Nonami | 455/574 |
| 5,909,490 A | 6/1999 | Sokolich et al. | |
| 6,064,894 A | 5/2000 | Zurek et al. | |
| 2004/0043801 A1 | 3/2004 | Shimokawatoko et al. | |
| 2006/0111163 A1 * | 5/2006 | Oh | 455/575.7 |
| 2007/0280497 A1 * | 12/2007 | Isberg et al. | 381/345 |

FOREIGN PATENT DOCUMENTS

| | | |
|---|---|---|
| EP | 1296535 | 3/2003 |
| WO | WO 2004/004408 | 1/2004 |
| WO | WO 2005/043871 | 5/2005 |
| WO | WO 2005/099302 | 10/2005 |

OTHER PUBLICATIONS

PCT International Search Report, International Application No. PCT/US2006/039628, Mailed Jan. 30, 2007.

* cited by examiner

*Primary Examiner*—Alexander Jamal
(74) *Attorney, Agent, or Firm*—Coats & Bennett, PLLC

(57) ABSTRACT

Loudspeaker sounds in a communications handset may be amplified in predetermined frequency ranges through positioning the loudspeaker between ported and unported spaces. In one embodiment, an empty volume of space disposed in front of the loudspeaker is included to shape the frequency response of the loudspeaker. A port connecting this volume of space to the environment may be located at a longitudinal end of the handset. In one embodiment, the port may pass through a space formed by an antenna loop. An additional empty volume of space may be disposed behind the loudspeaker to further shape the frequency response of the loudspeaker.

14 Claims, 5 Drawing Sheets

SHAPED LOUDSPEAKER OUTPUT IN A COMMUNICATIONS HANDSET

BACKGROUND

Wireless and cellular communications handsets are, by their very nature, mobile and used in a variety of locations. These locations include noisy environments such as public gatherings, construction sites, and areas where machinery is operated, such as airports or roadways. Thus, speaker loudness is an important consideration for users and manufacturers of these handsets. This may be particularly true for Push-To-Talk (PTT) type handsets, where incoming sounds may be broadcast either through an earpiece or a loudspeaker. When used in a speakerphone mode, incoming sounds may be directed through the loudspeaker. Thus, a user may position the PTT handset some nominal distance away from their ear during conversations with a remote caller. When used in this manner, the user should be able to distinguish sounds broadcast by the handset from other sounds generated around the user. That is, even with the noisiest of backgrounds, users should be able to recognize and identify communications broadcast by the handset.

It is generally understood that speaker loudness is proportional to driver size. However, as is the case with many consumer electronics, communications handset designs are incorporating more features and more components into smaller packages. Thus, larger speakers or audio drivers may be an impractical solution to generating increased volume. Other factors, including speaker efficiency and the power with which the speaker is driven, may also contribute to higher volume. Unfortunately, these factors may be limited by cost and battery life considerations. Therefore, a passive approach for shaping or increasing handset loudness that does not adversely impact other system characteristics may be a desirable solution.

SUMMARY

Embodiments of the present invention are directed to a mobile communications handset having a loudspeaker with an improved frequency response, particularly within a predetermined range of interest. The improved loudspeaker configuration may be implemented in a mobile communications handset having a housing and a wireless transceiver disposed within the housing for transmitting and receiving signals. A loudspeaker port may be disposed at one longitudinal end of the housing. This end may be a hinged end of a clamshell housing. The loudspeaker port emits sounds produced by a loudspeaker, with the output sounds shaped in part by a front acoustic volume disposed between the loudspeaker port and the loudspeaker. Generally, the acoustic volume and the loudspeaker port cooperate to excite resonant frequencies within a predetermined range when sounds are emitted from the loudspeaker.

In one embodiment, the front acoustic volume is an open space of between about 1 to 2 cubic centimeters. In one embodiment, the handset also has a substantially sealed rear acoustic volume disposed behind the loudspeaker. In one embodiment, the predetermined frequency range is between about 2 KHz and about 4 KHz.

In some embodiments, an antenna is coupled to the wireless transceiver and traverses an arcuate path from one lateral side of the housing to the opposite lateral side adjacent a longitudinal end of the housing. At some point along the arcuate path, the antenna is spaced from the housing. In at least one embodiment, the loudspeaker port passes through the space between the antenna and the housing. The loudspeaker port may extend substantially parallel or substantially perpendicular to a keypad on the handset.

DETAILED DESCRIPTION

The various embodiments disclosed herein are directed to methods and devices for shaping loudspeaker output in a communications handset. In general, the techniques disclosed herein provide a passive solution that uses acoustics to shape the loudspeaker output. The various embodiments may be implemented in a communications handset of the type indicated generally by the numeral 10 in FIG. 1. The exemplary communications handset 10 includes a clamshell design that is a common feature many communications handsets, including model Z520a available from Sony Ericsson Mobile Communications (USA) Inc. of Research Triangle Park, North Carolina. This type of handset design should not be construed as limiting since the teachings herein may be implemented in a variety of handset designs, including swivel action handsets such as model W600 or a fixed body handset such as model J300a, each also available from Sony Ericsson Mobile Communications.

Figure 1:
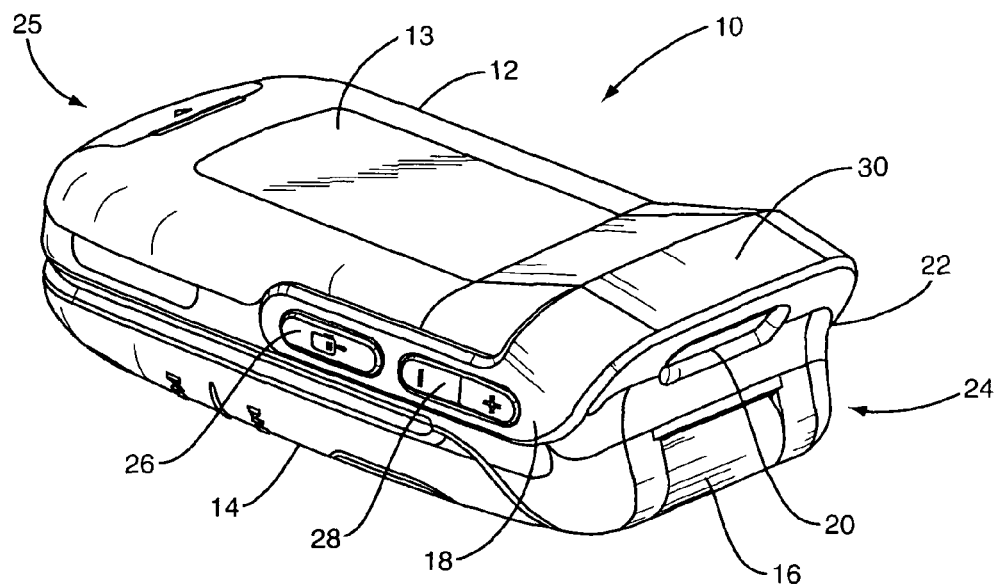
FIG. 1 is a perspective view of a communications handset incorporating one embodiment of a loudspeaker configuration according to the present invention.

In the exemplary embodiment shown in FIG. 1, the handset 10 comprises a first body portion 12 that is pivotally attached to a second body portion 14 at a hinge 16. The first body portion includes a substantially planar back surface 13. Similar to other conventional handsets, the first body portion 12 may comprise features such as a keypad (not visible in FIG. 1) that is substantially parallel to the back surface 13 while the second body portion 14 may include one or more displays (also not visible in FIG. 1). One or more of these displays may be visible when the handset 10 is closed as illustrated in FIG. 1. The first body portion 12 also includes various control buttons 26 providing access to one or more control functions and loudness control buttons 28.

The handset has a generally rectangular shape, with the distance between lateral side 18 and lateral side 22 defining a lateral dimension. The perpendicular longitudinal direction is generally defined between a first longitudinal end 24 and a second longitudinal end 25. In one embodiment, the longitudinal dimension is greater than the lateral dimension. The exemplary handset 10 includes a loudspeaker port 20 disposed at the first longitudinal end 24 of the first body portion 12. In addition, the handset 10 comprises a built-in antenna loop 30 that traverses a substantially arcuate path from the first lateral side 18 of the first body portion 12 to the opposite lateral side 22 of the first body portion 12. In the illustrated embodiment, the loudspeaker port 20 is disposed between the antenna loop 30 and the hinge 16. With the configuration shown, even as the handset 10 is opened and the second body portion 14 is flipped away from the first body portion 12, the loudspeaker port 20 advantageously remains unobstructed (see, e.g., FIG. 3).

Figure 2:
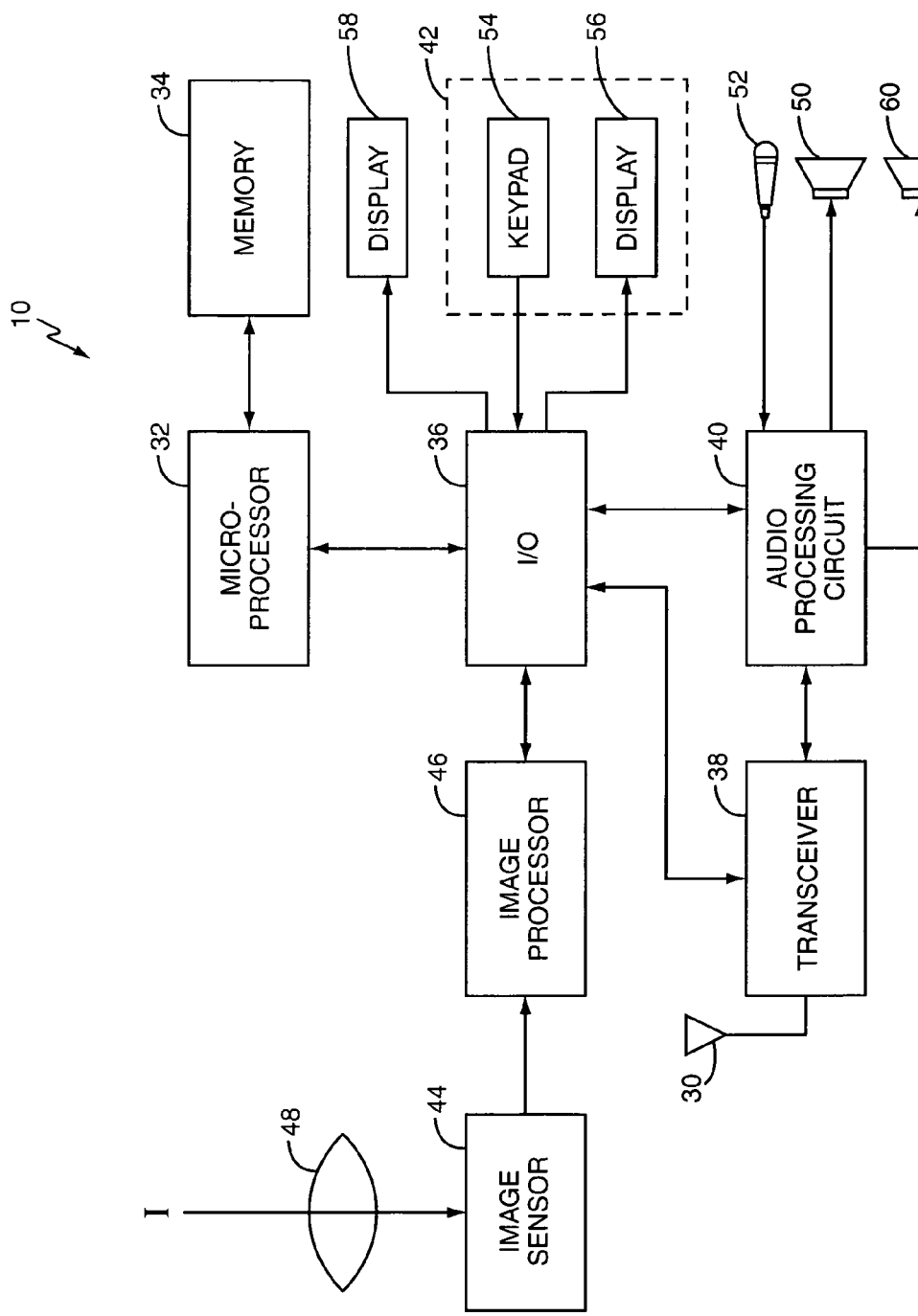
FIG. 2 is a block diagram illustrating various components in a communications handset according to one embodiment of the present invention.

As suggested above, the handset 10 may include other features not visible in the orientation shown in FIG. 1. Accordingly, FIG. 2 provides a block diagram showing various internal and external components of the exemplary handset 10. The handset 10 comprises a microprocessor 32, program memory 34, input/output circuit 36, transceiver 38, audio processing circuit 40, user interface 42, image sensor 44, image processor 46, and optical system 48. The microprocessor 32 controls the operation of the handset 10 according to programs stored in program memory 34. Input/output circuits 36 manage interaction between the microprocessor 32 and the user interface 42, transceiver 38, audio processing circuit 40, and image processing circuit 46. The audio processing circuit 20 provides basic analog output signals to the speakers 50, 60 and accepts analog audio inputs from the microphone 52. The transceiver 18 is coupled to the aforementioned antenna 30 for receiving and transmitting signals on a suitable communications network (not shown).

The user interface 42 comprises a keypad 54 and a display 56. The keypad 54 allows the operator to dial numbers, enter commands, and select options. They keypad 54 may include a conventional 0-9 alphanumeric pad as well as various other input keys or buttons, including side-mounted button 26 and volume buttons 28, described above. The display 56 allows the operator to see dialed digits, call status, images or other media, and other service information. As indicated above, one or more additional displays 58 may be disposed on an exterior surface of first body portion 12 or second body portion 14 to allow handset operators to view graphical information if the clamshell device is closed. In certain alternative mobile handsets, a touchpad display combines user input and output functions.

The exemplary handset 10 may also function as a camera phone. In such cases, an image sensor 44 captures images formed by light impacting on the surface of the image sensor 44. The image sensor 44 may be any conventional image sensor 44, such as a charge-coupled device (CCD) or complementary metal oxide semiconductor (CMOS) image sensor. Incoming light energy may be focused on the sensor 44 by an integrated optical system 48 comprising one or more optical elements. Image processor 46 processes raw image data collected by the image sensor 44 for subsequent output to the display 56, 58, storage in memory 34, or for transmission by the transceiver 38.

The exemplary handset 10 also includes a microphone 52, an ear speaker 50, and a loudspeaker 60. The microphone 52 converts input sounds, including the user's speech, into electrical audio signals. The ear speaker 50 and loudspeaker 60 convert electrical signals into audible signals that can be heard by the user. The ear speaker 50 allows the user to use the handset as a conventional phone while holding the handset 10 to their ear and listening to output sounds through the ear speaker 50. Alternatively, the user may hear the output sounds through the loudspeaker 60 by placing the handset in a speakerphone mode. This latter mode of use is often employed while communicating in a PTT conversation. The term "speaker" as used herein, is intended to encompass a general class of electro-acoustic transducers that include inductive coil drivers, reed drivers, electrostatic drivers, and other audio output devices known in the art capable of converting electrical audio signals into sounds.

Figure 3:
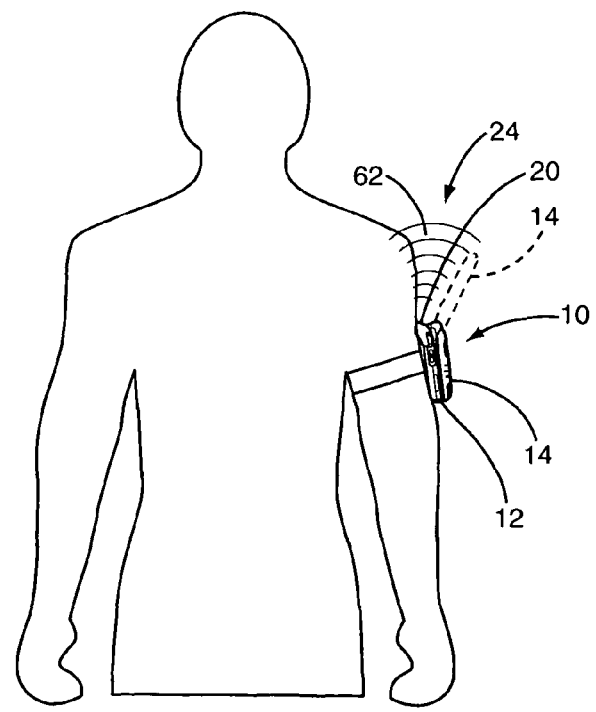
FIG. 3 is a schematic representation illustrating an exemplary use of a communications handset incorporating one embodiment of a loudspeaker configuration according to the present invention.

FIG. 3 shows one exemplary use of the handset 10 illustrated in FIG. 1. As demonstrated, the handset 10 is secured to a user's arm, with the loudspeaker port 20 facing upward. As oriented, sound waves, identified in FIG. 3 as a series of parallel arcs 62, emanate from the loudspeaker port 20 in the direction of the user's head. This illustrated example is not intended to insinuate that sounds are only heard if the loudspeaker port 20 points in the direction of the user's ears. In fact, certain frequencies emitted by the loudspeaker 60 through the loudspeaker port 20 may be considered directionless in the sense that their wavelength are larger than the distance between the handset 10 and the user's ears. For example, at frequencies of about 1000 Hz and below, the wavelength of audible sounds is in excess of about 34 cm or 13 in. Thus, for these sounds, the orientation of the handset 10 may be less important.

However, for other frequencies, including those in the range of between about 1000 Hz and 4000 Hz, the wavelengths fall to a within a range between about 8-34 cm or 3-13 inches. Therefore, the example shown in FIG. 3 illustrates one possible advantage to placement of the loudspeaker port 20 at a longitudinal end 24 of the handset 10. With this orientation, sounds with shorter wavelengths, sometimes termed directional sounds, may be directed towards the user's ears due to the positioning of the loudspeaker port 20.

Figure 4:
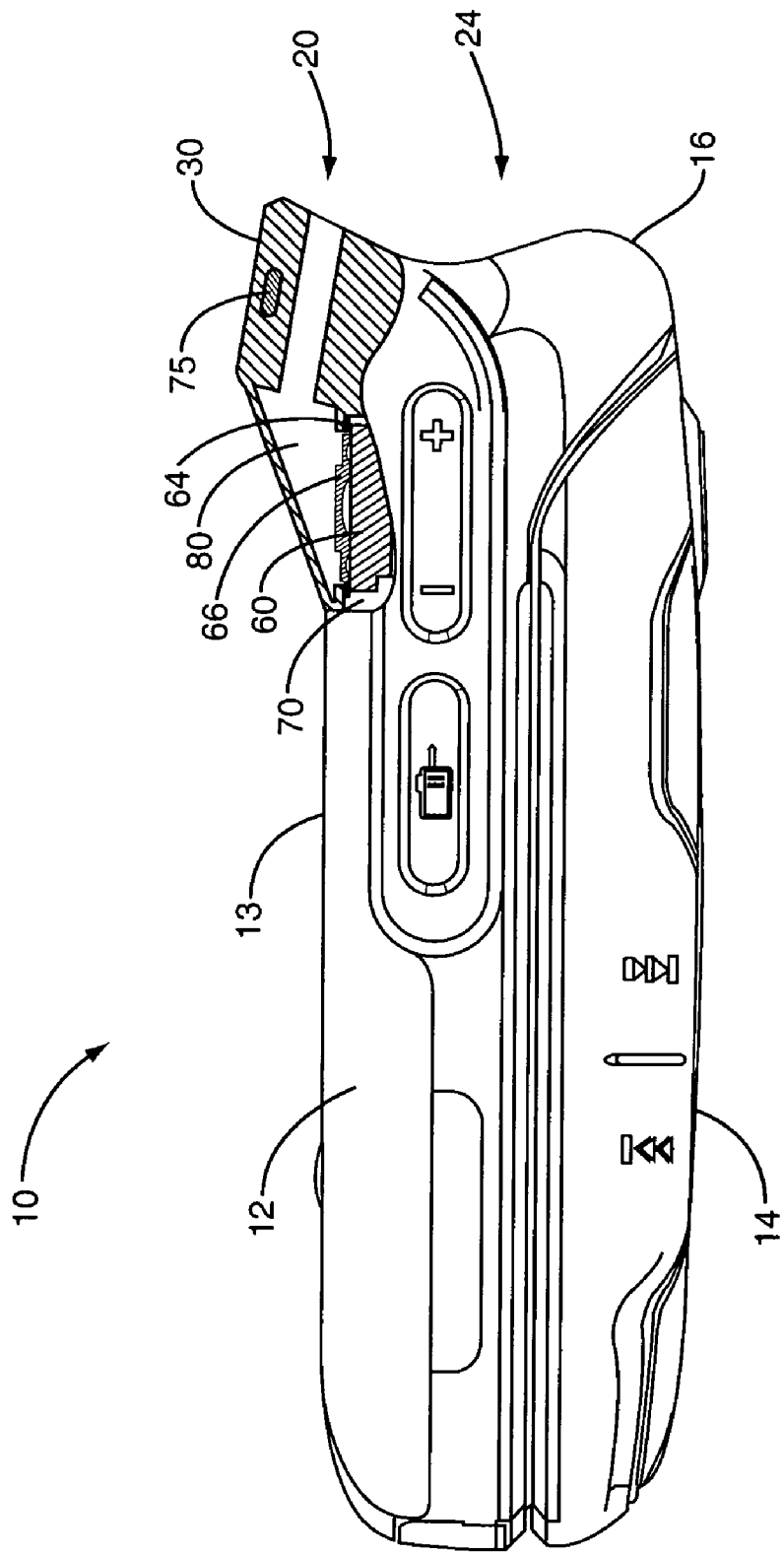
FIG. 4 is a side view, including a partial cutaway section of a communications handset incorporating one embodiment of a loudspeaker configuration according to the present invention.

FIG. 4 provides a side view of the exemplary handset 10. FIG. 4 also includes a partial cutaway section illustrating the configuration of loudspeaker 60 and loudspeaker port 20. The loudspeaker port 20 exits the handset at the hinged longitudinal end 24 of the handset and in a direction that is roughly parallel to the back surface 13. As indicated above, the loudspeaker port 20 passes under the antenna loop 30. FIG. 4 specifically shows the loudspeaker port 20 passing between antenna conductors 75 and other portions of the handset 10, including hinge 16, second body portion 14, and the loudspeaker 60. The antenna conductors 75 may comprise rigid or flexible conductors that generally traverse a path similar to the antenna loop 30 shown in FIG. 1. The antenna conductors 75 may be coupled at both ends of the antenna loop 30 to form a "loop antenna" as is known in the art or may be coupled to the transceiver 38 at a proximal end and simply terminate at a distal end.

FIG. 4 also shows a rear acoustic volume 70 behind the loudspeaker 60 and a front acoustic volume 80 in front of the loudspeaker 60. In the illustrated embodiment, the loudspeaker 60 is covered by a grill 66. In addition, a seal 64 is disposed at the loudspeaker 60 mounting surface. Therefore, the rear acoustic 70 volume may be isolated from the front acoustic volume 80. Further, the rear acoustic volume 70 may be substantially sealed. In other embodiments, the rear acoustic volume may be ported in a manner similar to the porting of the front acoustic volume 80 through loudspeaker port 20. In yet another embodiment, the loudspeaker 60 may be inverted so that it faces into the rear acoustic volume 70. Each of these various configurations may shape the perceived and measurable loudness and frequency response of the loudspeaker 60.

To the extent the rear acoustic volume 70 may be sealed, the enclosed space behind the loudspeaker may help prevent out-of-phase sound waves from the rear of the loudspeaker 60 from combining with the positive phase sound waves from the front of the loudspeaker 60, which would result in interference patterns. These interference patterns tend to cancel one another, causing the efficiency of the loudspeaker 60 to be compromised, particularly in the low frequencies where the wavelengths are large enough that interference will affect the listening area in the vicinity of the handset 10.

The front acoustic volume 80 uses a port 20 that is open to the environment to increase loudness and sound pressure as compared to a similar sealed enclosure or to configurations where the loudspeaker 60 fires into open air. In speaker design, ports are often known as a specifically tuned opening in an enclosure that allows audio output generated from a speaker driver to move air and produce sound waves. The port allows air inside the enclosure to move to the outside of the enclosure in order to improve sound output. In the configuration shown in FIG. 4, the front acoustic volume 80 works in conjunction with the loudspeaker 60 and the rear acoustic volume 70 to produce an amplification of a range of frequencies emanated from the loudspeaker 60.

Figure 5:
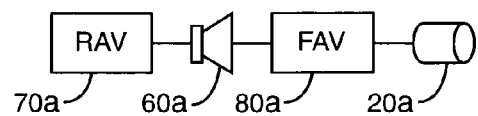
FIG. 5 is a schematic acoustic model representing one embodiment of a loudspeaker configuration according to the present invention.

A simplified representation of the loudspeaker configuration is provided in FIG. 5. An acoustic component model is shown in FIG. 5. In this model, box 70a represents a rear acoustic volume analogous to the rear acoustic volume 70 shown in the exemplary handset 10 in FIG. 4. Similarly, box 80a represents a front acoustic volume analogous to the front acoustic volume 80, speaker 60a is representative of the loudspeaker 60, and the radiating port 20a is representative of the loudspeaker port 20.

Figure 6:
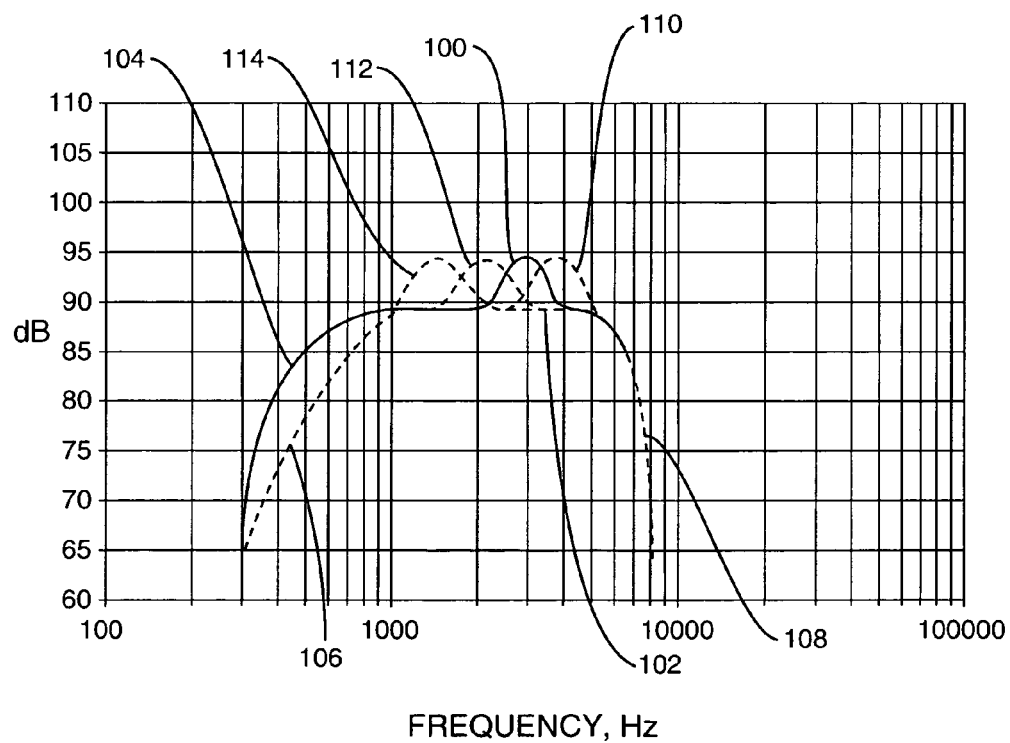
FIG. 6 is a graphical illustration representing frequency responses for various embodiments of a loudspeaker configuration according to the present invention.

FIG. 6 shows actual and alternative frequency response curves for various embodiments of the loudspeaker 60 configuration. The horizontal axis in FIG. 6 represents the frequency of loudspeaker 60 output sounds while the vertical axis represents the loudness in decibels, dB. The loudness may be measured using a Sound Pressure Level (SPL) meter. In one embodiment, the results illustrated may be obtained through measurement at a distance of 20 cm from the handset. This distance approximates a representative handset-to-ear distance during speakerphone use.

In FIG. 6, various dashed lines are shown to illustrate the flexibility offered by changing the size of the relevant acoustic volumes 70, 80. It is generally understood that the frequency response that is produced through changes in these volumes 70, 80 may be predicted using a Thiele-Small analysis. The Thiele-Small approach analyzes the electromechanical behavior of a speaker voice coil, magnet, and cone, interacting with the cone suspension and the air in and outside of an enclosure. This analysis considers such variables as the size of the driver, the axial movement range of the driver, the resonant frequency of the driver, chamber volumes, power used to drive the speaker, and dimensionless variables known in the art simply as Q factors. An alternative form of analysis uses a lumped component model, where certain physical components with acoustical properties may be approximated as behaving similarly to standard electronic components or simple combinations of components. These and other types of analyses known in the art may be used to predict the loudspeaker 60 frequency response.

In one embodiment, a 16 mm loudspeaker 60 may be used in conjunction with a rear acoustic volume of about 2 cubic centimeters and a front acoustic volume of between about 1 and 2 cubic centimeters to produce an elevated response between about 2 KHz and 4 KHz as identified by the portion of the curve in FIG. 6 labeled 100. This elevated response reflects about 3-5 dB increase over the curve labeled 102 that is representative of the loudspeaker 60 without the front acoustic volume 80 and the loudspeaker port 20. Depending on the size of the driver used and the amount of space available, resonance type gains of up to 10 dB or more may be achievable. Given this improved frequency response over a certain frequency range, this configuration may be referred to as a bandpass configuration, with the amplified sounds exiting from a bandpass port 20. Note also that the response at lower frequencies (i.e., less than about 1 KHz) identified by the portion of the curve labeled 104 is elevated relative to the dashed curve labeled 106. This particular increase in loudness may be attributable to the enclosed rear acoustic volume 70. The trailing response at higher frequencies indicated by dashed curve 108 is representative of mechanical and resonance limitations of the loudspeaker 60.

As indicated, the elevated loudness identified by curve portion 100 represents an increase in loudness for sounds that are in the 2 KHz to 4 KHz range. This range represents an range of sounds that is important in speech perception and in identifying audible tones and other sounds produced by the handset 10. Speech and other sounds can be described in terms of formant frequencies. A formant is a peak in an acoustic frequency spectrum which results from the resonant frequencies of any acoustical system. Sounds in human speech are distinguishable because different sounds have different formant frequencies. In general, the formant with the lowest frequency is called $f_1$, the second $f_2$, and the third $f_3$. Typically, the two first formants, $f_1$ and $f_2$, are enough to disambiguate a vowel. However, greater intelligibility, both of sound and speaker identity, may be achieved through recognition of higher order formants. Many vowel sounds in the American English language include first formants that are below about 800 Hz. For certain sounds, the second formants are close to the first formant and occur below about 1 KHz. For others, the separation is greater, with the second formant occurring between about 1500 KHz and 3500 KHz. Also relevant to human sound perception is the knowledge that trained singers are able to produce a clear formant around 3000 Hz that allows the singers to be heard and understood over an orchestra. Thus, amplification of sounds in or around these frequency ranges may help handset 10 users distinguish speech and sounds transmitted by the loudspeaker 60 from surrounding background noises.

As suggested above, the size of the acoustic volumes 70, 80, and various other parameters may be adjusted to shape the frequency response of the loudspeaker 60 system. Specifically, the parameters may be adjusted to shift the amplified region up (as in curve 110) or down (as in curves 112, 114) in frequency. Furthermore, the range of elevated frequency may also be wider or narrower than those illustrated based in part upon space constraints and the type of driver used.

Figure 7:
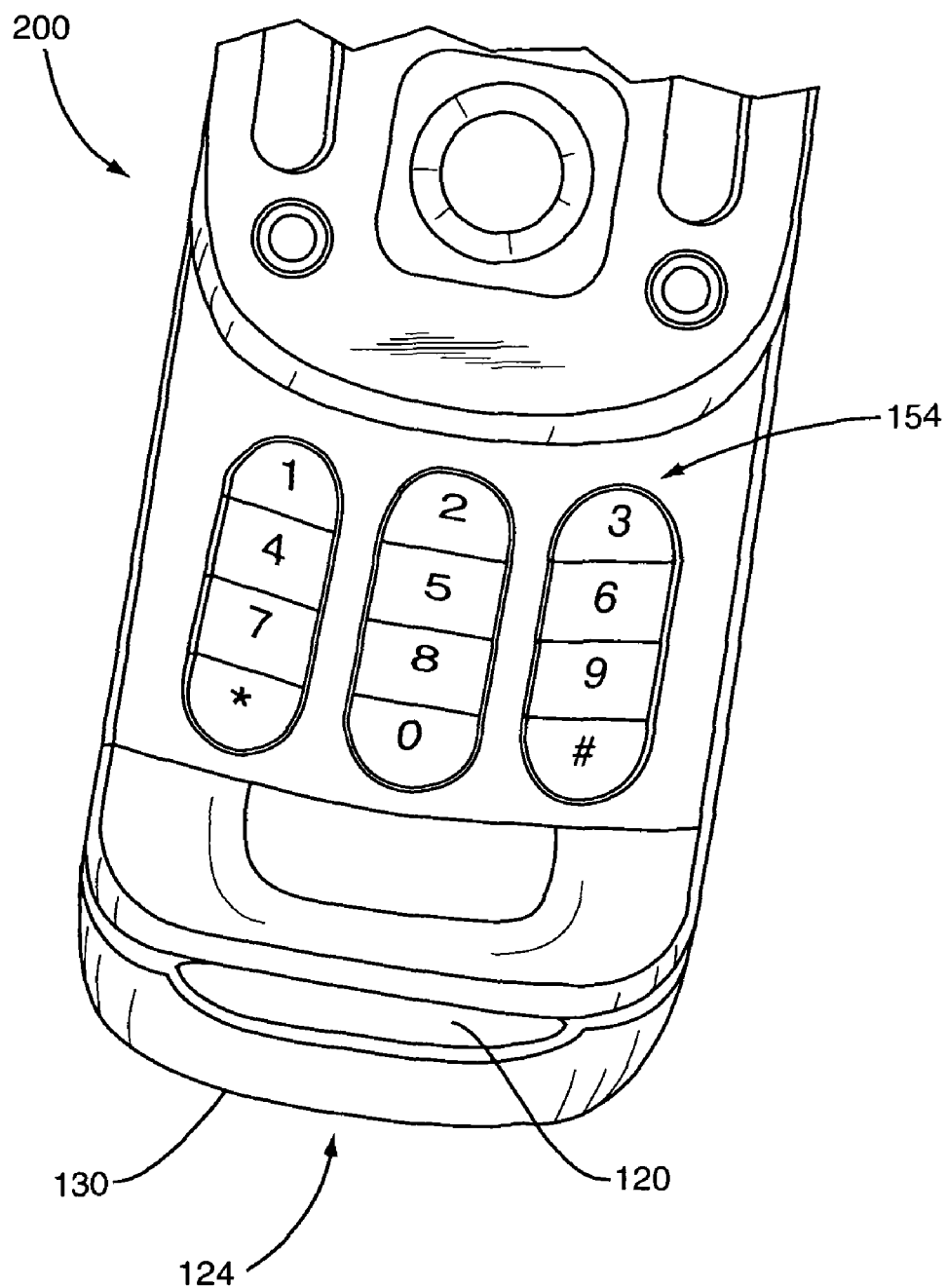
FIG. 7 is a partial view of a communications handset incorporating one embodiment of a loudspeaker configuration according to the present invention.

The present invention may be carried out in other specific ways than those herein set forth without departing from the scope and essential characteristics of the invention. For example, one embodiment of handset 10 is provided illustrating a front acoustic volume 80 and a loudspeaker port 20 disposed near a hinged longitudinal end 24 of the handset 10. In other embodiments, the front acoustic volume and loudspeaker port may disposed at the longitudinal end opposite the hinge 16. For fixed-body handsets, the front acoustic volume and loudspeaker port may be disposed at a longitudinal end above the display or at the opposite end below the keypad. As an example of an alternative embodiment, a handset 200 is shown in FIG. 7. In this embodiment, the loudspeaker port 120 is disposed at a longitudinal end 124 of the handset 200 that below the keypad 154, opposite to the hinged end (not shown in FIG. 7). Note also, that in the exemplary handset 200 illustrated in FIG. 7, the loudspeaker port 120 also exits through an antenna loop 130. Further, the loudspeaker port 120 exits in a direction that is substantially perpendicular to the keypad 154. This configuration may advantageously direct sounds away from a surface on which the handset 200 rests. The present embodiments are, therefore, to be considered in all respects as illustrative and not restrictive, and all changes coming within the meaning and equivalency range of the appended claims are intended to be embraced therein.

What is claimed is:

1. A mobile communications handset comprising:
   a housing having a first lateral side, a second lateral side, and a longitudinal end;
   a wireless transceiver disposed within said housing for transmitting and receiving signals;
   an antenna coupled to the wireless transceiver, the antenna traversing from the first lateral side to the second lateral side and spaced at least partly from the housing; and
   a loudspeaker port passing through the space between the antenna and the housing.

2. The handset of claim 1 wherein the loudspeaker port extends between the exterior of the housing and a front acoustic volume disposed in front of a loudspeaker.

3. The handset of claim 2 wherein the front acoustic volume and the loudspeaker port are tuned to amplify sounds from the loudspeaker falling within a predetermined frequency range.

4. The handset of claim 3 wherein the predetermined frequency range is between about 2000 Hz and about 4000 Hz.

5. The handset of claim 1 wherein the loudspeaker port extends parallel to a keypad on the handset.

6. The handset of claim 1 wherein the loudspeaker port extends perpendicular to a keypad on the handset.

7. The handset of claim 1 wherein the antenna is disposed at the longitudinal end.

8. A method of shaping loudspeaker output in a communications handset, the method comprising:
   providing a loudspeaker in a communications handset for selectively operating the communications handset in a speakerphone mode;
   exciting resonant frequencies within a predetermined range by emitting sounds from the loudspeaker; and
   porting the loudspeaker sounds out to the environment through an antenna loop that traverses the communications handset from a first lateral side to a second lateral side, and that is spaced at least partly away from an exterior surface of the communications handset.

9. The method of claim 8 wherein the predetermined range falls between about 2000 Hz and 4000 Hz.

10. The method of claim 8 wherein exciting resonant frequencies within a predetermined range comprises positioning the loudspeaker between a ported front acoustic volume and a rear acoustic volume.

11. The method of claim 8 wherein exciting resonant frequencies within a predetermined range comprises at least partially confining sound waves produced by the loudspeaker to a ported front acoustic volume having a size between about 1 to 2 cubic centimeters.

12. The method of claim 8 further comprising exciting resonant frequencies within a second predetermined range by sealing a rear acoustic volume disposed behind the loudspeaker.

13. The method of claim 8 wherein porting the loudspeaker sounds out to the environment through an antenna loop comprises directing sounds in a direction that is parallel to a keypad on the device.

14. The method of claim 8 wherein porting the loudspeaker sounds out to the environment through an antenna loop comprises directing sounds in a direction that is perpendicular to a keypad on the device.

* * * * *